(12) United States Patent
Ikeda et al.

(10) Patent No.: US 9,942,497 B2
(45) Date of Patent: Apr. 10, 2018

(54) SOLID-STATE IMAGING APPARATUS AND IMAGING WITH A LIMITING CIRCUIT FOR LIMITING AN AMPLIFIER OUTPUT IN FIRST AND SECOND PERIODS TO FIRST AND SECOND RANGES

(71) Applicant: CANON KABUSHIKI KAISHA, Tokyo (JP)

(72) Inventors: Yasuji Ikeda, Kawasaki (JP); Hiroki Hiyama, Sagamihara (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 614 days.

(21) Appl. No.: 14/226,996

(22) Filed: Mar. 27, 2014

(65) Prior Publication Data

US 2014/0312207 A1   Oct. 23, 2014

(30) Foreign Application Priority Data

Apr. 18, 2013 (JP) ................................. 2013-087390

(51) Int. Cl.
*H04N 5/359* (2011.01)
*H04N 5/378* (2011.01)
*H04N 5/357* (2011.01)

(52) U.S. Cl.
CPC ........... *H04N 5/3598* (2013.01); *H04N 5/357* (2013.01); *H04N 5/378* (2013.01)

(58) Field of Classification Search
CPC ...... H04N 5/3598; H04N 5/335; H04N 5/357; H04N 5/3575; H04N 5/361; H04N 5/363; H04N 5/365; H04N 5/378

(Continued)

(56) References Cited

U.S. PATENT DOCUMENTS 6,605,850 B1   8/2003   Kochi et al.
6,670,990 B1   12/2003  Kochi et al.
(Continued)

FOREIGN PATENT DOCUMENTS

JP    2002118427 A  *  4/2002
JP    2008-42679       2/2008
(Continued)

OTHER PUBLICATIONS

Japanese Office Action dated Jan. 10, 2017 during prosecution of related Japanese application No. 2013-087390.

(Continued)

*Primary Examiner* — Que T Le
*Assistant Examiner* — Jennifer Bennett
(74) *Attorney, Agent, or Firm* — Fitzpatrick, Cella, Harper & Scinto

(57) ABSTRACT

A solid-state imaging apparatus and an imaging system which can reduce the occurrence of darkening and decrease deterioration in CDS performance are provided. The solid-state imaging apparatus has: a pixel unit including a photoelectric conversion unit for generating a signal by a photoelectric conversion; an amplifier unit for amplifying the signal generated by the photoelectric conversion unit; and a limiting circuit for limiting a level of an output signal from the amplifier unit. The pixel unit outputs a noise signal under a reset state during a first period and outputs a pixel signal under a non-reset state during a second period. The limiting circuit limits the level of the output signal from the amplifier unit in the first period, lower than the level of the output signal from the amplifier unit in the second period.

15 Claims, 7 Drawing Sheets

(58) Field of Classification Search
USPC ........... 250/208.1, 214 A, 214 R; 348/229.1, 348/294, 297, 300, 302, 308; 257/257, 257/258, 290, 291, 292
See application file for complete search history.

(56) References Cited

U.S. PATENT DOCUMENTS

| | | | |
|---|---|---|---|
| 6,960,751 B2 | 11/2005 | Hiyama et al. | |
| 6,963,372 B1* | 11/2005 | Hiyama | H04N 5/3658 348/302 |
| 7,110,030 B1 | 9/2006 | Kochi et al. | |
| 7,187,052 B2 | 3/2007 | Okita et al. | |
| 7,283,305 B2 | 10/2007 | Okita et al. | |
| 7,429,764 B2 | 9/2008 | Koizumi et al. | |
| 7,538,804 B2 | 5/2009 | Okita et al. | |
| 7,557,847 B2 | 7/2009 | Okita et al. | |
| 7,755,688 B2 | 7/2010 | Hatano et al. | |
| 7,812,873 B2 | 10/2010 | Hiyama et al. | |
| 7,812,876 B2 | 10/2010 | Hiyama et al. | |
| 8,045,034 B2 | 10/2011 | Shibata et al. | |
| 8,106,955 B2 | 1/2012 | Okita et al. | |
| 8,120,686 B2 | 2/2012 | Hatano et al. | |
| 8,130,303 B2* | 3/2012 | Kondo | H04N 5/3575 348/301 |
| 8,134,622 B2* | 3/2012 | Kobayashi | H04N 5/335 348/300 |
| 8,208,055 B2 | 6/2012 | Hiyama | |
| 8,218,050 B2 | 7/2012 | Ogura et al. | |
| 8,325,260 B2 | 12/2012 | Yamazaki et al. | |
| 8,451,360 B2 | 5/2013 | Nakamura et al. | |
| 8,493,487 B2 | 7/2013 | Takada et al. | |
| 8,552,481 B2 | 10/2013 | Hiyama et al. | |
| 8,610,795 B2* | 12/2013 | Kondo | H04N 5/353 348/155 |
| 8,643,765 B2 | 2/2014 | Takada et al. | |
| 8,711,259 B2 | 4/2014 | Maehashi et al. | |
| 2010/0053396 A1* | 3/2010 | Okita | H04N 5/3595 348/301 |
| 2010/0309356 A1* | 12/2010 | Ihara | H04N 5/3658 348/300 |
| 2012/0086841 A1 | 4/2012 | Ono et al. | |
| 2012/0261552 A1 | 10/2012 | Ikeda | |
| 2013/0026343 A1 | 1/2013 | Saito et al. | |
| 2013/0057742 A1 | 3/2013 | Nakamura et al. | |
| 2013/0062503 A1 | 3/2013 | Saito et al. | |
| 2013/0068930 A1 | 3/2013 | Nakamura et al. | |
| 2013/0088625 A1 | 4/2013 | Iwata et al. | |
| 2013/0206961 A1 | 8/2013 | Ikeda et al. | |
| 2014/0320717 A1 | 10/2014 | Hiyama et al. | |

FOREIGN PATENT DOCUMENTS

JP 2009-200660 9/2009
JP 2010-57137 3/2010

OTHER PUBLICATIONS

Japanese Office Action dated Aug. 29, 2017 during prosecution of related Japanese application No. 2013-087390.

* cited by examiner understand# SOLID-STATE IMAGING APPARATUS AND IMAGING WITH A LIMITING CIRCUIT FOR LIMITING AN AMPLIFIER OUTPUT IN FIRST AND SECOND PERIODS TO FIRST AND SECOND RANGES

BACKGROUND OF THE INVENTION

Field of the Invention

The present invention relates to a solid-state imaging apparatus and an imaging system.

Description of the Related Art

In an MOS type solid-state imaging apparatus, when very strong light such as a sun enters an angle of view of an imaging plane, there is a case where a phenomenon called a high luminance darkening (or, simply referred to as "darkening") in which a center portion of the strong light is displayed in black occurs. Such a darkening occurs in the case of performing a CDS (correlated double sampling) operation for eliminating fixed pattern noises caused by a variation in threshold value of a transistor of every pixel or KT/C noises at the time of resetting. In the CDS operation, an N signal showing a noise level of the pixel and an S signal showing a data level are read out and a difference between the two signals is operated and output.

According to the Official Gazette of Japanese Patent Application Laid-Open No. 2008-42679, a difference between an S signal and an N signal is assured by a transistor for limiting the N signal on a pixel output line and limiting a level adapted to write the N signal into a holding capacitor for holding the N signal obtained after it was amplified by an amplifier unit, thereby preventing the darkening.

When the N signal is read out, if the strong light is irradiated to a photoelectric conversion unit, charges generated in the photoelectric conversion unit enter a floating diffusion region, thereby causing the N signal to be fluctuated from a correct level. When such a fluctuation is large, the difference between the S signal and the N signal is small, so that the darkening phenomenon occurs. In order to perform the CDS operation, symmetry between a circuit for holding the N signal and a circuit for holding the S signal is important.

However, according to the Official Gazette of Japanese Patent Application Laid-Open No. 2008-42679, since the N signal holding circuit and the S signal holding circuit have different configurations, there is a case where an elimination accuracy of the CDS deteriorates in dependence on values of the signals. Also in a method of limiting the N signal by changing a high level voltage of a control electrode of the transistor without using the transistor for limiting the level for writing the signal into the holding capacitor, voltage amplitudes of control electrodes of the two transistors differ. There is, consequently, a problem that the elimination accuracy of the CDS deteriorates due to a difference of charge injection or the like.

SUMMARY OF THE INVENTION

According to an aspect of the invention, there is provided a solid-state imaging apparatus comprising: a pixel unit including a photoelectric conversion unit configured to generate a signal by a photoelectric conversion; an amplifier unit configured to amplify the signal generated by the photoelectric conversion unit; and a limiting circuit configured to limit a level of an output signal from the amplifier unit, wherein the pixel unit outputs a noise signal under a reset state during a first period, and outputs a noise signal under a non-reset state during a second period, and the limiting circuit limits the level of the output signal from the amplifier unit in the first period, lower than the level of the output signal from the amplifier unit in the second period.

Further features of the present invention will become apparent from the following description of exemplary embodiments with reference to the attached drawings.

DESCRIPTION OF THE EMBODIMENTS (First Embodiment)

Figure 1:
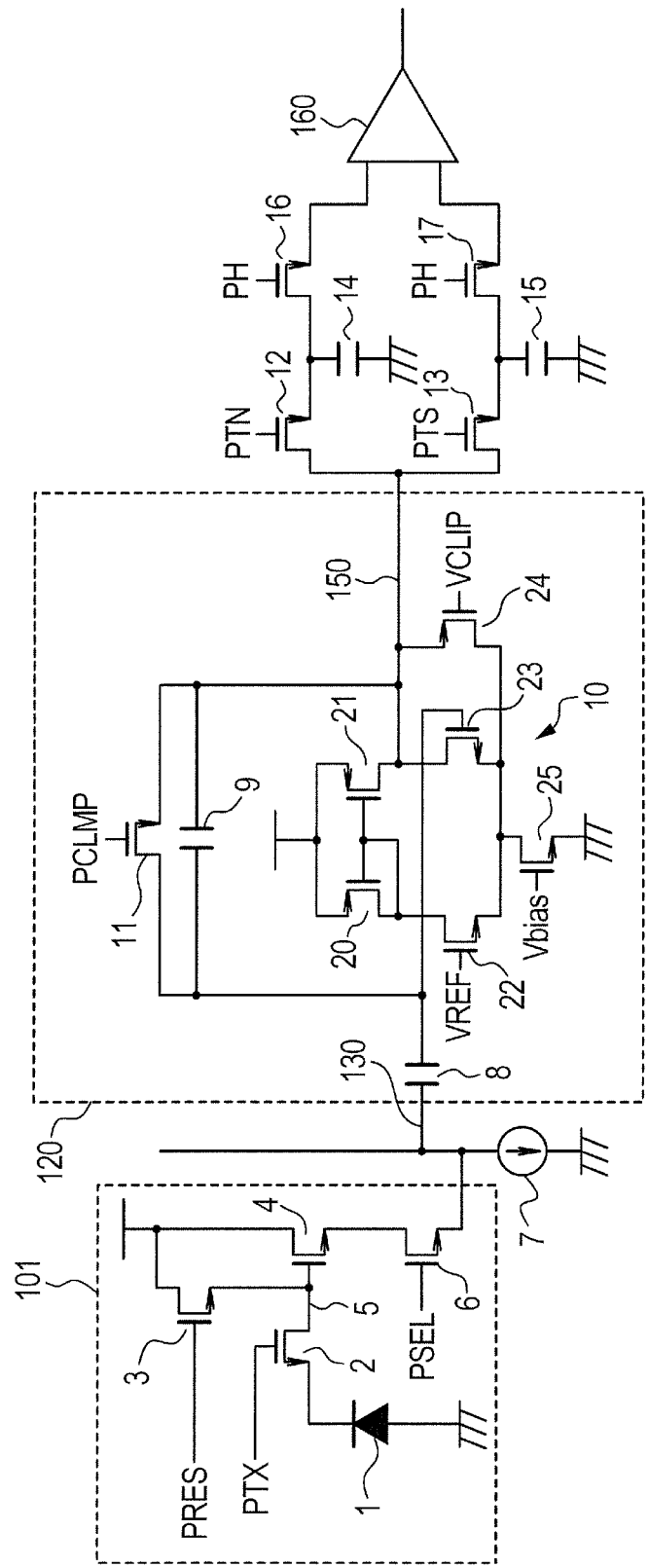
FIG. 1 is a diagram illustrating an example of a configuration of a solid-state imaging apparatus according to the first embodiment.

FIG. 1 is a diagram illustrating an example of a configuration of a solid-state imaging apparatus according to the first embodiment of the invention. A pixel unit 101 has a photoelectric conversion unit 1, a transfer gate 2, a reset transistor 3, an amplifying transistor 4, a charge to voltage converter 5, and a selecting transistor 6. A plurality of pixel units 101 are provided in a two-dimensional matrix form. The photoelectric conversion unit 1 has, for example, a photodiode, receives light, and generates charges. That is, the photoelectric conversion unit 1 generates a signal through a photoelectric conversion. The transfer gate 2 transfers the charges generated by the photoelectric conversion unit 1 to the charge to voltage converter 5 in response to a transfer pulse PTX. The charge to voltage converter 5 is, for example, a floating diffusion. An electric potential of the charge to voltage converter 5 is determined by an amount of charges transferred to the charge to voltage converter 5. The charge to voltage converter 5 converts the amount of charges into a voltage. The amplifying transistor 4 amplifies the voltage from the charge to voltage converter 5. In response to a pixel selecting pulse PSEL, the selecting transistor 6 outputs the voltage amplified by the amplifying transistor 4 to a pixel output line 130. The reset transistor 3 resets the electric potential of the charge to voltage converter 5 to a power source potential. A source of the reset transistor 3 is connected to the charge to voltage converter 5 and a gate of the amplifying transistor 4. A drain of the reset transistor 3 is connected to a node of the power source potential.

The pixel output line 130 is an output node of a source follower circuit formed by the amplifying transistor 4 and a constant current load 7. An amplifier unit 120 amplifies a signal of the pixel output line 130 generated by the pixel unit 101. The amplifier unit 120 has, for example, an input capacitor 8, a feedback capacitor 9, a differential amplifier circuit 10, and a clamping switch 11. The differential amplifier circuit 10 has an NMOS transistor 25 constructing a constant current circuit, PMOS transistors 20 and 21 and NMOS transistors 22 and 23 constructing differential pairs, and a PMOS clipping transistor 24 showing a feature of the embodiment. The PMOS clipping transistor 24 is a limiting circuit for limiting an output from the differential amplifier circuit 10.

By limiting an output of the amplifier unit 120 by using the PMOS clipping transistor 24, symmetry between paths of an S signal and an N signal is maintained and a high elimination accuracy of the CDS can be maintained. In the PMOS clipping transistor 24, a source is connected to a drain of the transistor 21, a drain is connected to a drain of the NMOS transistor 25, and a gate is connected to a node of a voltage VCLIP. When the N signal is output, the PMOS clipping transistor 24 limits a maximum electric potential of the output from the amplifier unit 120.

The N signal as a noise level in the output from the amplifier unit 120 is held in a capacitor 14 through a transfer switch 12. The S signal as a signal level is held in a capacitor 15 through a transfer switch 13. When switching transistors 16 and 17 are turned on, the N signal and the S signal held in the capacitors 14 and 15 are amplified in a differential manner by an output unit 160 including a differential amplifier and a difference between them is output from the output unit 160.

Figure 2:
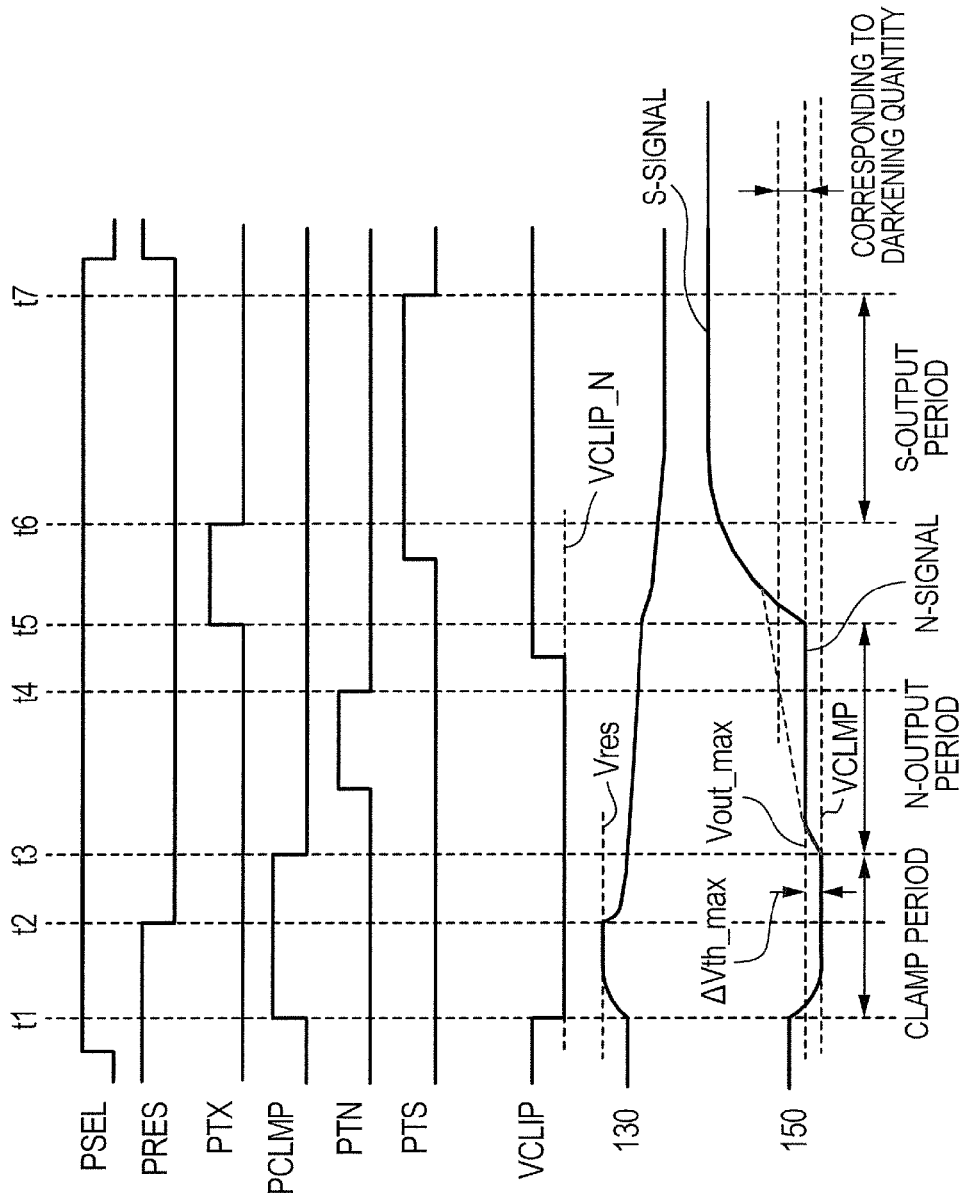
FIG. 2 is a diagram illustrating a driving method of the solid-state imaging apparatus.

FIG. 2 is a timing chart illustrating an example of the operation of the solid-state imaging apparatus. The pixel selecting pulse PSEL is used to turn on the selecting transistor 6. A signal of a row of the pixel unit 101 selected during a high-level period is output to the pixel output line 130. A reset pulse PRES is a driving pulse of the reset transistor 3. During the high-level period, the reset transistor 3 is turned on and an electric potential of the charge to voltage converter 5 is reset to a reset voltage Vres. At time t1 during the high-level period of the reset pulse PRES, a voltage PCLMP rises and the voltage VCLIP becomes a voltage VCLIP_N as a clip level of the N signal. The clip voltage VCLIP_N is lower than the high level. When the reset pulse PRES trails at time t2, the reset transistor 3 is turned off. Thus, the pixel unit 101 outputs the noise signal under the reset state to the amplifier unit 120 through the pixel output line 130 during a first period. At this time, since the voltage PCLMP is at the high level, the clamping switch 11 is turned on, an input node and the output node of the differential amplifier circuit 10 are short-circuited and a voltage equal to a voltage VREF is output to an amplifier unit output node 150. When the voltage PCLMP trails at time t3, the clamping switch 11 is turned off and the N signal (noise signal) is output to the output node 150 of the differential amplifier circuit 10. When a transfer pulse PTN rises in this state, the transfer switch 12 is turned on and the N signal is accumulated in the capacitor 14. When the transfer pulse PTN trails at time t4, the transfer switch 12 is turned off and the N signal is held in the capacitor 14.

If the voltage VCLIP was set to the high level here, the clipping transistor 24 is turned off. If light of a high luminance entered the photoelectric conversion unit 1 for the period of time during which the N signal is output, there is a case where charges generated there enter the charge to voltage converter 5. In this case, a level of the N signal changes so as to approach the S signal. The voltage at the amplifier unit output node 150 shown by a broken line after time t3 is held in the capacitor 14 at time t4 and a darkening occurs.

In the embodiment, in order to prevent the darkening, such a phenomenon that the level of the N signal which is output from the differential amplifier circuit 10 changes so as to approach the S signal is limited by the clipping transistor 24 during this period of time. When the voltage VCLIP is set to the clip voltage VCLIP_N, a current flows in the clipping transistor 24, so that the maximum electric potential of the amplifier unit output node 150 is limited. It is necessary that such a limitation exhibits its effect for a period of time during which the N signal is output. It is further important that for a period of time during which the S signal is output, if the gate of the clipping transistor 24 is held at the clip voltage VCLIP_N, the output of the S signal is limited and the correct S signal cannot be obtained. In this case, therefore, it is necessary to switch the voltage VCLIP at the gate of the clipping transistor 24 to the high level. At time t1, it is necessary to switch the voltage VCLIP at the gate of the clipping transistor 24 to the clip voltage VCLIP_N from the high level at the time when the S signal of the preceding row has been output. When the voltage VCLIP at the gate wiring of the clipping transistor 24 is switched, due to a delay of the gate wiring of the clipping transistor 24, it takes a predetermined time until the electric potentials of the gate wirings of the clipping transistors 24 of all columns are stabilized. In order to supply the clip voltage VCLIP_N to the gate wiring of the clipping transistor 24 simultaneously with the start of the output of the N signal and to obtain its effect, a surplus time is necessary and a read-out time is extended.

As a countermeasure against such a problem, another feature of the embodiment is timing for switching the voltage VCLIP of the gate wiring of the clipping transistor 24 to the clip voltage VCLIP_N. That is, the voltage VCLIP of the gate wiring of the clipping transistor 24 is switched to the clip voltage VCLIP_N during at least a part of a period of time of t2 to t3 corresponding to the reset period of the differential amplifier circuit 10, broadly, t1 to t3. Or, the voltage VCLIP of the gate wiring of the clipping transistor 24 may be switched to the clip voltage VCLIP_N during a horizontal transfer period of time after time t7.

Further, according to the clip voltage VCLIP_N, so long as it is equal to a voltage (VREF+VOD+ΔVth), the switching to the clip voltage VCLIP_N and the resetting operation can be performed in parallel without exerting an influence on the resetting operation of the amplifier unit 120. ΔVth is a voltage of a variation of the differential amplifier circuit 10 to the reference voltage VREF. VOD is an overdrive voltage of the transistor of the differential amplifier circuit 10. A description will be made in detail herein below.

At the amplifier unit output node 150, if a limited maximum voltage Vout_max of the N signal is as low as possible, a darkening prevention effect is higher. If the maximum voltage Vout_max is too low, in the case where the clip voltage VCLIP_N is supplied at time t1, the correct N signal output cannot be obtained. Therefore, it is necessary that the limited maximum voltage Vout_max at the amplifier unit output node 150 is sufficiently higher than the voltage VREF during the clamping period. Specifically speaking, since the voltage at the amplifier unit output node 150 fluctuates from the reference voltage VREF by a maximum quantity ΔVth_max of the device variation at most, the maximum voltage Vout_max is set to (Vout_max=VREF+ΔVth_max). Since it is sufficient to set the voltage VCLIP to a voltage which is lower than the maximum voltage Vout_max by a quantity of an overdrive voltage pVOD of the PMOS transistor 24, the voltage VCLIP is set to (the voltage VCLIP=VREF+ΔVth−|pVOD|). Thus, the output of the N signal is limited only for the output period of the N signal and, at the time of the high luminance, the N signal is also limited to at most the voltage Vout_max.

After time t4, the voltage VCLIP is switched to such a voltage that the clipping transistor 24 does not limit the output of the differential amplifier circuit 10, for example, to the high level (power source voltage). Thus, since the clipping transistor 24 does not limit the output during the output period of the S signal, the non-limited S signal is read out.

When the pixel transfer pulse PTX rises at time t5, the transfer gate 2 is turned on and the transfer of the charges from the photoelectric conversion unit 1 to the charge to voltage converter 5 is started. When the pixel transfer pulse PTX trails at time t6, the transfer gate 2 is turned off and the output period of the S signal is started. Thus, the pixel unit 101 outputs the pixel signal under the non-reset state to the amplifier unit 120 through the pixel output line 130 during the second period. The amplifier unit 120 amplifies the pixel signal of the pixel output line 130 without being limited by the clipping transistor 24 and outputs the S signal (pixel signal) to the output node 150.

When the transfer pulse PTS rises after that, the transfer switch 13 is turned on and the S signal at the output node 150 is accumulated in the capacitor 15. When the transfer pulse PTS trails at time t7, the transfer switch 13 is turned off and the S signal is held in the capacitor 15.

When the switching transistors 16 and 17 are turned on after that, the output unit 160 outputs a difference between the N signal held in the capacitor 14 and the signal held in the capacitor 15 and outputs the pixel signal in which the noise level has been eliminated.

Further, it is a feature of the embodiment that the clipping transistor 24 is provided in a feedback loop of the amplifier unit 120. As mentioned above, in the case where a capacitor load is seen at the output node 150 of the amplifier unit 120, since the clipping transistor 24 is provided in the feedback loop, such a situation that a seeing manner of the load capacitor varies in dependence on the voltage at the output node 150 is eliminated. Consequently, even at a voltage near the limited voltage, an influence on small signal characteristics and response characteristics is suppressed, a voltage range on which such an influence is exerted is also small, and substantially, there is no influence on the image. The apparatus operates without increasing electric power consumption.

The differential amplifier circuit 10 may have a cascode configuration in which a common gate amplifier circuit is overlaid to a common source amplifier circuit. In this case, although the output voltage range is narrow, a gain increases and a gain error at a voltage near the limited voltage can be decreased.

The amplifier unit 120 limits the level of the output signal by the clipping transistor (limiting circuit) 24 in the first period during which the N signal is output, lower than the level of the output signal by the clipping transistor in the second period during which the S signal is output. The clipping transistor 24 is an MOS transistor and limits the level of the output signal of the amplifier unit 120 by flowing a current in the MOS transistor 2.

As mentioned above, in the embodiment, the clipping transistor 24 is connected between the output node 150 of the differential amplifier circuit 10 and the constant current circuit 25 and the voltage VCLIP is set to the clip voltage VCLIP_N during the N signal output period. Thus, the output of the N signal is limited in the amplifier unit 120 in which the N signal output node 150 and the S signal output node 150 are common, and the darkening can be reduced. If the photoelectric conversion unit accumulates holes as signal charges, a signal amplitude is opposite to that in FIG. 2.

(Second Embodiment)

Figure 3:
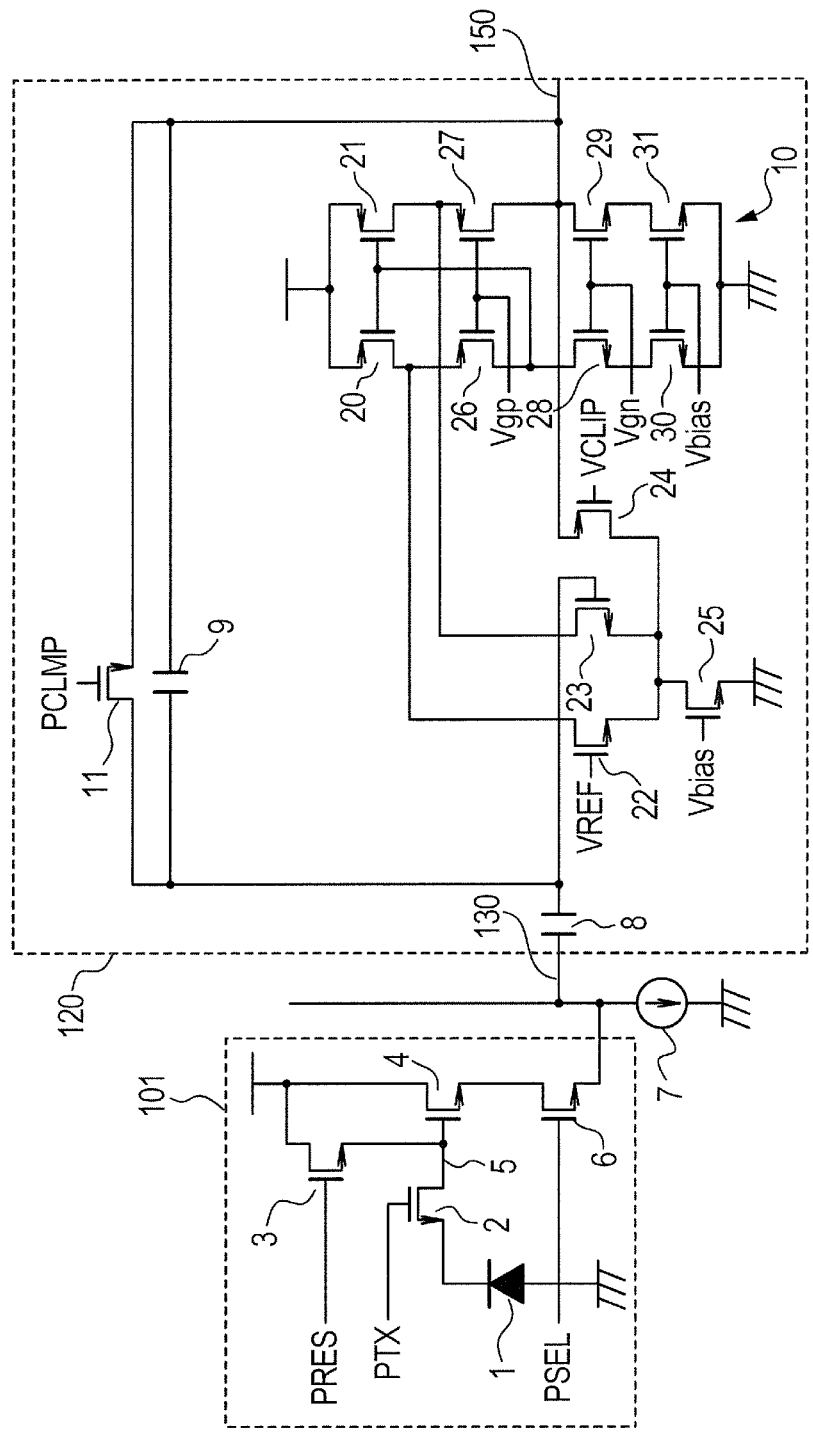
FIG. 3 is a diagram illustrating an example of a configuration of a solid-state imaging apparatus according to the second embodiment.

FIG. 3 is a diagram illustrating an example of a configuration of a solid-state imaging apparatus according to the second embodiment of the invention. In the embodiment (FIG. 3), the differential amplifier circuit 10 differs from that in the first embodiment (FIG. 1). The embodiment will be described hereinbelow with respect to a point different from the first embodiment. The differential amplifier circuit 10 in the embodiment is a folded cascode differential amplifier circuit. The differential amplifier circuit 10 has: the NMOS transistor 25; the NMOS transistors 22 and 23 constructing a differential input pair; and the PMOS transistors 20, 21, 26, and 27 and NMOS transistors 28, 29, 30, and 31 constructing differential pairs connected in the cascode. The NMOS transistor 25 constructs a constant current circuit. Further, the differential amplifier circuit 10 has the PMOS clipping transistor 24 for limiting the output of the amplifier circuit 10 showing the feature of the embodiment.

By limiting the voltage itself of the output node 150 of the amplifier unit 120 by using the PMOS clipping transistor 24, the symmetry between the paths of the S signal and the N signal is maintained and the high elimination accuracy of the CDS can be maintained. In the PMOS clipping transistor 24, the source is connected to a drain (output node 150) of the PMOS transistor 27, the drain is connected to the drain of the NMOS transistor 25, and the gate is connected to the node of the voltage VCLIP. When the N signal is output, the clipping transistor 24 limits a maximum electric potential at the output node 150 of the amplifier unit 120 by the voltage VCLIP.

The operation of the solid-state imaging apparatus of the embodiment is similar to that in the first embodiment. Also in the embodiment, in a manner similar to the first embodiment, the clipping transistor 24 is provided in the feedback loop of the amplifier unit 120, the seeing manner of the load capacitor does not change in dependence on the voltage at the output node 150. Consequently, even at a voltage near the limited voltage, an influence on the small signal characteristics and the response characteristics is suppressed, the voltage range on which such an influence is exerted is also small, and substantially, there is no influence on the image. In the embodiment, although the electric power consumption increases by using the folded cascode differential amplifier circuit, by keeping the output voltage range while increasing the gain, a large difference between the S signal and the N signal can be held. That is, the darkening can be reduced.

As mentioned above, in the embodiment, the clipping transistor 24 is connected between the output node 150 and the constant current circuit 25 of the differential pair connected in the cascode, and the voltage VCLIP is set to the clip voltage VCLIP_N during the N signal output period. Thus, the output of the N signal is limited in the amplifier unit 120 in which the N signal output node 150 and the S signal output node 150 are common, and the darkening can be reduced.

(Third Embodiment)

Figure 4:
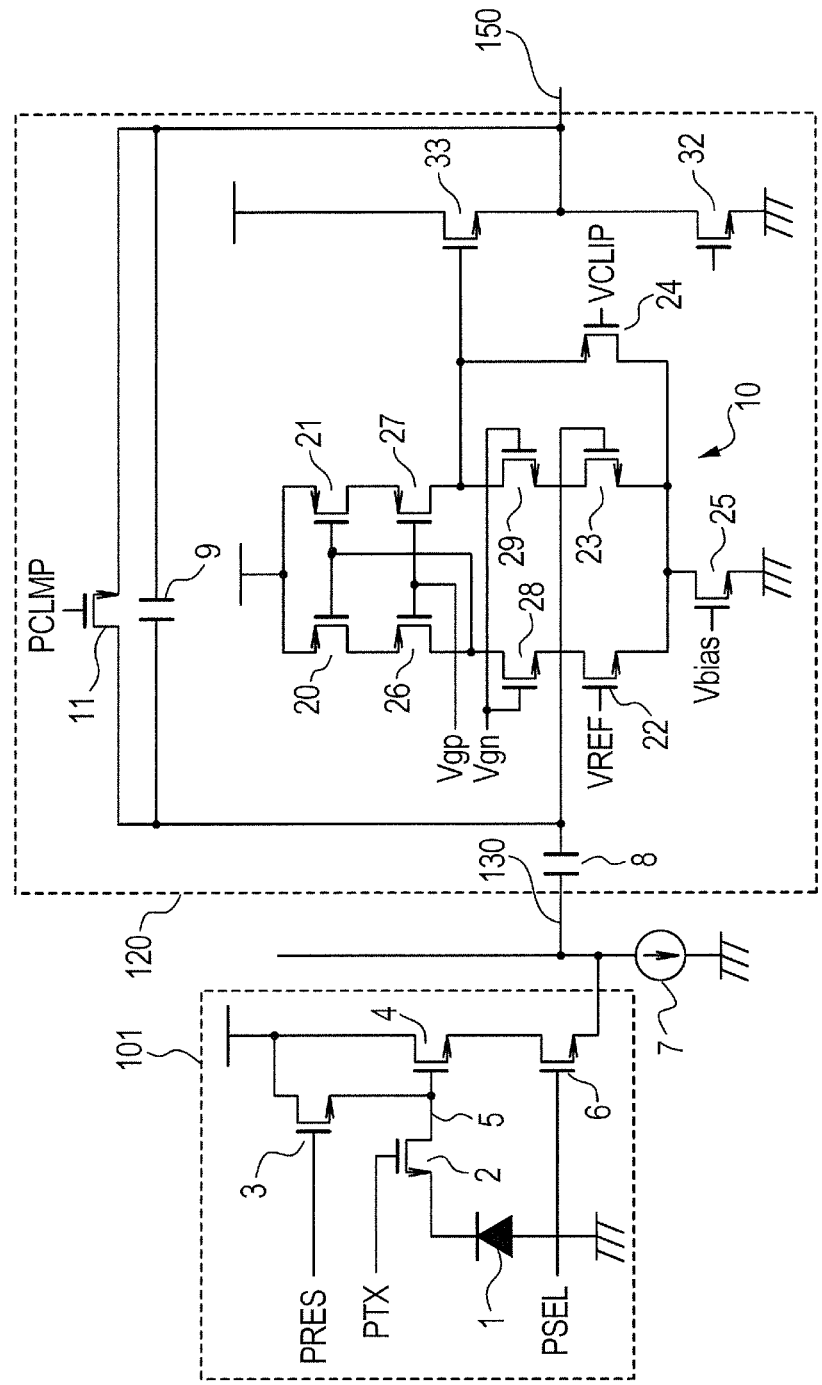
FIG. 4 is a diagram illustrating an example of a configuration of a solid-state imaging apparatus according to the third embodiment.

FIG. 4 is a diagram illustrating an example of a configuration of a solid-state imaging apparatus according to the third embodiment of the invention. In the embodiment (FIG. 4), the amplifier unit 120 differs from that in the first embodiment (FIG. 1). The embodiment will be described hereinbelow with respect to a point different from the first embodiment. In the embodiment, the output voltage of the cascode differential amplifier circuit 10 is limited by using the PMOS transistor 24 and a common source amplifier circuit (32, 33) is connected to a following stage of the cascode differential amplifier circuit 10, thereby obtaining the output of the amplifier unit 120. The common source amplifier circuit (32, 33) is a buffer circuit and constructs a source follower. The cascode differential amplifier circuit 10 has: the PMOS transistors 20, 21, 26, and 27 and NMOS transistors 22, 23, 28, and 29 constructing differential pairs connected in a cascode; and the NMOS transistor 25 constructing the constant current circuit. The source follower has the NMOS transistors 32 and 33. The feedback capacitor 9 is connected between the output node 150 of the source follower and the amplifier circuit 10 and constructs a feedback loop. Therefore, the limitation of the output voltage by the PMOS clipping transistor 24 is performed in the feedback loop.

By limiting the output voltage of the amplifier circuit 10 by using the PMOS clipping transistor 24, the symmetry between the paths of the S signal and the N signal is maintained and the high elimination accuracy of the CDS can be maintained. In the PMOS clipping transistor 24, the source is connected to the drain of the PMOS transistor 27, the drain is connected to the drain of the NMOS transistor 25, and the gate is connected to the node of the voltage VCLIP. When the N signal is output, the clipping transistor 24 limits the maximum electric potential at the output node 150 of the differential cascode amplifier circuit at the initial stage of the amplifier circuit 10, thereby limiting the output voltage of the amplifier unit 120.

The operation of the solid-state imaging apparatus of the embodiment is similar to that in the first embodiment. Also in the embodiment, in a manner similar to the first embodiment, the clipping transistor 24 is provided in the feedback loop of the amplifier unit 120, the seeing manner of the load capacitor does not change in dependence on the voltage at the output node 150. Consequently, even at a voltage near the limited voltage, an influence on the small signal characteristics and the response characteristics is suppressed, the voltage range on which such an influence is exerted is also small, and substantially, there is no influence on the image. By providing the source follower circuit for the output unit of the amplifier unit 120, although the electric power consumption is large, even when an external load is large, the apparatus can be driven.

As mentioned above, in the embodiment, the clipping transistor 24 is connected between the output node of the cascode differential amplifier circuit 10 and the constant current circuit 25 and the voltage VCLIP is set to the clip voltage VCLIP_N during the N signal output period. Thus, the output of the N signal is limited in the amplifier unit 120 in which the N signal output node 150 and the S signal output node 150 are common, and the darkening can be reduced.

(Fourth Embodiment)

Figure 5:
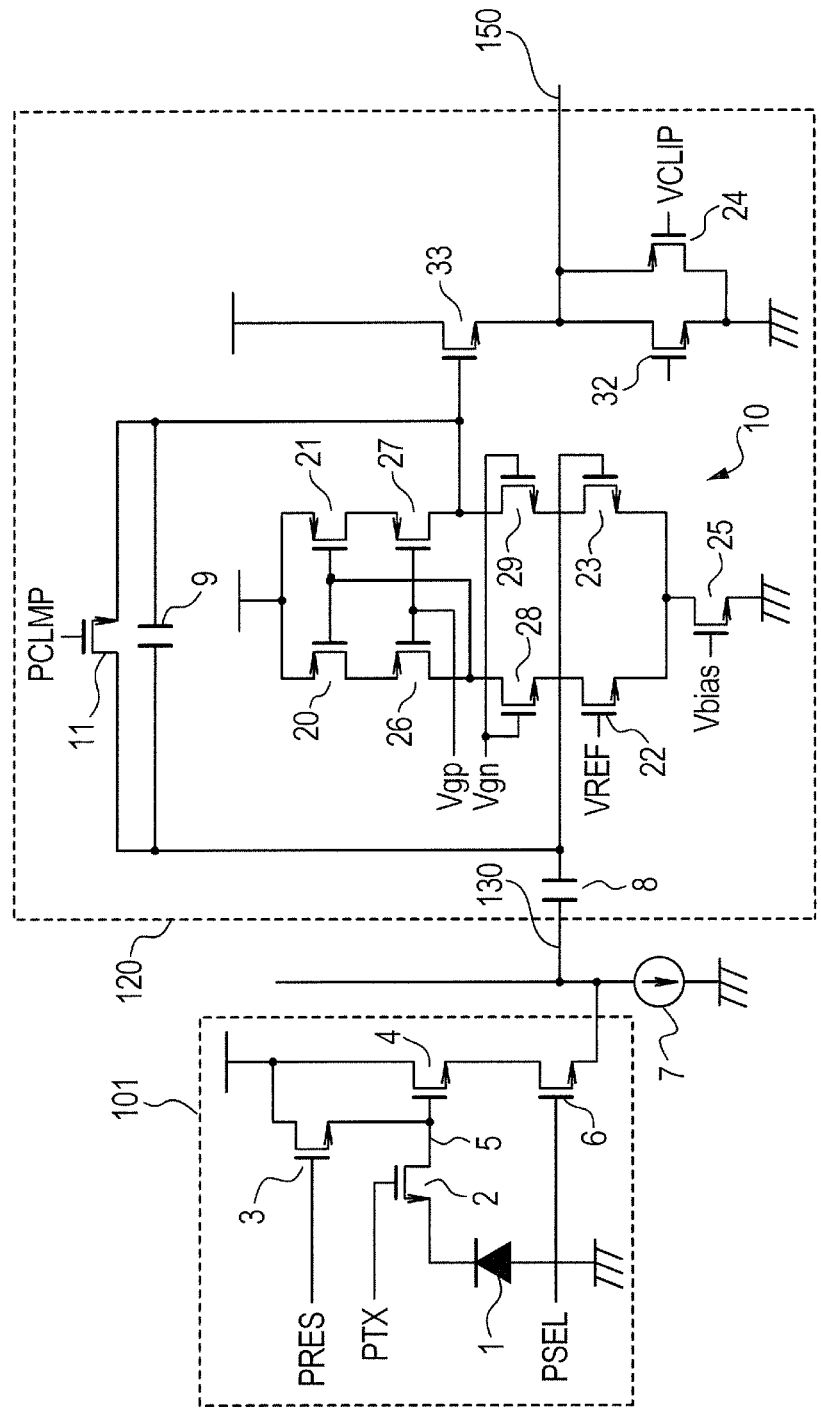
FIG. 5 is a diagram illustrating an example of a configuration of a solid-state imaging apparatus according to the fourth embodiment.

FIG. 5 is a diagram illustrating an example of a configuration of a solid-state imaging apparatus according to the fourth embodiment of the invention. In the embodiment (FIG. 5), a position where the clipping transistor 24 is provided differs from that in the third embodiment (FIG. 4). The embodiment will be described hereinbelow with respect to a point different from the first embodiment. The amplifier unit 120 has: a source follower 33 at the following stage of the differential amplifier circuit 10; and the PMOS clipping transistor 24 connected to the source follower 33. In the embodiment, the voltage of the output node 150 of the source follower 33 is limited by using the PMOS clipping transistor 24. The feedback capacitor 9 is connected between an output node of the differential amplifier circuit 10 and an input node of the differential amplifier circuit 10 and constructs a feedback loop. The source follower 33 is connected at the following stage of the feedback loop.

By limiting the voltage of the output node 150 of the source follower 33 by using the PMOS clipping transistor 24, the symmetry between the paths of the S signal and the N signal is maintained and the high elimination accuracy of the CDS can be maintained. In the PMOS clipping transistor 24, the source is connected to a drain (output node 150) of the transistor 33, the drain is connected to a node of a ground potential, and the gate is connected to the node of the voltage VCLIP. By setting the voltage VCLIP to the clip voltage VCLIP_N, when the N signal is output, the clipping transistor 24 limits the voltage at the output node 150 of the amplifier unit 120. The clipping transistor 24 is provided out of the feedback loop of the amplifier unit 120 and is provided for the output node 150 of the amplifier unit 120.

The operation of the solid-state imaging apparatus of the embodiment is similar to that in the third embodiment. By providing the source follower circuit 33 for the output node of the amplifier unit 120, even when an external load is large, the apparatus can be driven.

As mentioned above, the clipping transistor 24 is connected between the output node 150 of the source follower 33 and the node of the ground potential and the voltage VCLIP is set to the clip voltage VCLIP_N during the output period of the N signal. Thus, the output of the N signal is limited in the amplifier unit 120 in which the N signal output node 150 and the S signal output node 150 are common, and the darkening can be suppressed.

(Fifth Embodiment)

Figure 6:
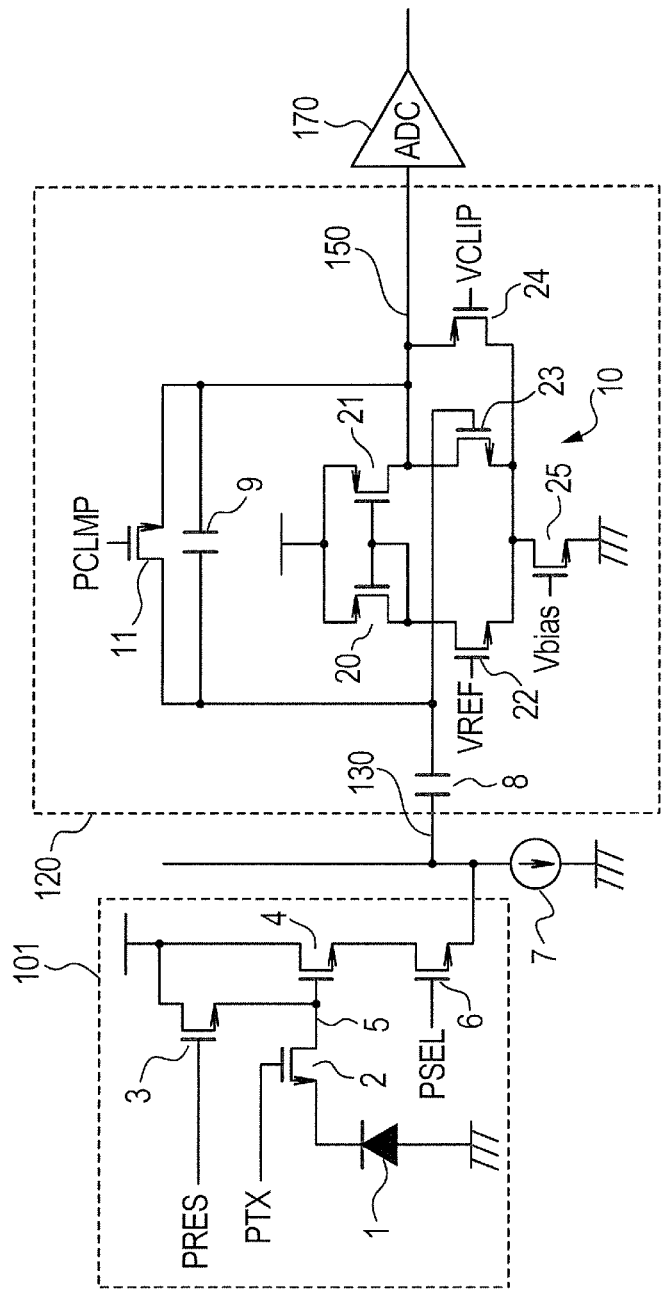
FIG. 6 is a diagram illustrating an example of a configuration of a solid-state imaging apparatus according to the fifth embodiment.

FIG. 6 is a diagram illustrating an example of a configuration of a solid-state imaging apparatus according to the fifth embodiment of the invention. In the embodiment (FIG. 6), an analog to digital converter (A/D converter) 170 is added to the first embodiment (FIG. 1). The embodiment will be described hereinbelow with respect to a point different from the first embodiment. The amplifier unit output node 150 is connected to an input node of the A/D converter 170. The A/D converter 170 converts the analog signal amplified by the amplifier unit 120 into a digital signal. The solid-state imaging apparatus of the embodiment has a plurality of pixel units 101 of a two-dimensional matrix form, has the analog to digital converter 170 every column, and does not have a holding units of the N signal and the S signal. Therefore, it is necessary that the limitation of the output voltage of the amplifier unit 120 is performed in the amplifier unit 120. Even in a case where the amplifier unit output node 150 is connected to the input node of the A/D converter 170, the output voltage of the amplifier unit 120 is limited by the clipping transistor 24. Also in the second to fourth embodiments, the A/D converter 170 can be provided in a manner similar to the fifth embodiment.

The operation of the solid-state imaging apparatus of the embodiment is similar to that in the first embodiment. In the embodiment, in the case where the voltage of the amplifier unit output node 150 is input to the A/D converter 170, the output voltage of the amplifier unit 120 is limited during the output period of the N signal, and the darkening can be suppressed.

(Sixth Embodiment)

Figure 7:
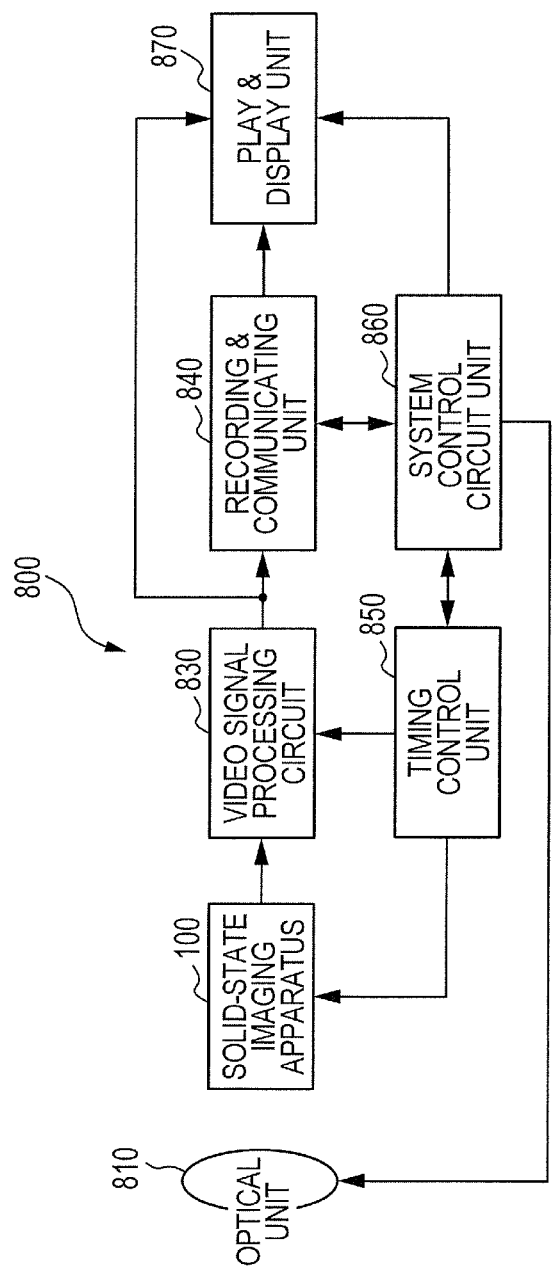
FIG. 7 is a diagram illustrating an example of a configuration of an imaging system according to the sixth embodiment.

FIG. 7 is a diagram illustrating an example of a configuration of an imaging system according to the sixth embodiment of the invention. An imaging system 800 has, for example: an optical unit 810; the solid-state imaging apparatus 100; a video signal processing circuit unit 830; a recording & communicating unit 840; a timing control circuit unit 850; a system control circuit unit 860; and a play & display unit 870. The solid-state imaging apparatus 100 is the solid-state imaging apparatus in the first to fifth embodiments.

The optical unit 810 as an optical system such as a lens or the like focuses the light from the object to the pixel unit 101 in which a plurality of pixels are two-dimensionally provided in the solid-state imaging apparatus 100, thereby forming an object image. At timing based on a signal from the timing control circuit unit 850, the solid-state imaging apparatus 100 outputs a signal corresponding to the light focused to the pixel unit 101. The signal which was output from the solid-state imaging apparatus 100 is input to the video signal processing circuit unit 830 as a video signal processing unit. The video signal processing circuit unit 830 performs a signal process to the input signal in accordance with a method decided by a program or the like. The signal obtained by the process in the video signal processing circuit unit 830 is transmitted as image data to the recording & communicating unit 840. The recording & communicating unit 840 transmits a signal to form an image to the play & display unit 870, thereby allowing the play & display unit 870 to play and display a moving image or a still image. The recording & communicating unit 840 also receives the signal from the video signal processing circuit unit 830, communicates with the system control circuit unit 860, and also performs an operation for recording the signal to form the image into a recording medium (not shown).

The system control circuit unit 860 integratedly controls the operation of the imaging system and controls the driving of the optical unit 810, timing control circuit unit 850, recording & communicating unit 840, and play & display unit 870, respectively. The system control circuit unit 860 has, for example, a storage device (not shown) such as a recording medium, in which a program or the like necessary to control the operation of the imaging system is recorded. The system control circuit unit 860 supplies, for example, a signal to switch a driving mode in accordance with the operation of the user into the imaging system. As a specific example, there are a change of a row to be read out or a row to be reset, a change of an angle of view associated with an electronic zoom, a shift of an angle of view associated with an electronic vibration isolation, and the like. The timing control circuit unit 850 controls the drive timing of the solid-state imaging apparatus 100 and the video signal processing circuit unit 830 on the basis of the control which is made by the system control circuit unit 860.

The foregoing embodiments are nothing but the specific examples when embodying the invention and a technical scope of the invention should not be limitedly interpreted by them. That is, the invention can be embodied in various forms without departing from its technical idea or its principal feature. For example, the clipping transistor 24 is not limited to a transistor constructed by a PMOS transistor.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-087390, filed Apr. 18, 2013, which is hereby incorporated by reference herein in its entirety.

What is claimed is:

1. A solid-state imaging apparatus comprising:
   a pixel unit including a photoelectric conversion unit configured to generate a first signal by a photoelectric conversion and a pixel amplification unit configured to input the first signal and to output a second signal onto an output line;
   an amplifier unit, connected to the output line, configured to amplify the second signal output onto the output line by the pixel unit; and
   a limiting circuit configured to limit a level of an output signal from the amplifier unit, wherein
   as the second signal, the pixel unit outputs a noise signal under a reset state during a first period and outputs a pixel signal under a non-reset state during a second period,
   the limiting circuit limits the level of the output signal from the amplifier unit in the first period to a first range, and limits the level of the output signal from the amplifier unit in the second period to a second range, the first range being narrower than the second range, and
   the limiting circuit is switched from the first range to the second range before the second period,
   the amplifier unit has a differential amplifier having a first input node and a second input node,
   the pixel signal from the pixel unit is input to the first input node, and a reference voltage is input to the second input node, and
   the first range is determined based on the reference voltage and an offset voltage of the differential amplifier.

2. The solid-state imaging apparatus according to claim 1, wherein the amplifier unit has a differential amplifier circuit,
   the differential amplifier circuit has a differential pair and a constant current circuit, and
   the limiting circuit is provided between an output node of the differential amplifier circuit and the constant current circuit.

3. The solid-state imaging apparatus according to claim 1, wherein the amplifier unit has a folded cascode amplifier circuit,
   the folded cascode amplifier circuit has a constant current circuit, a differential input pair and a differential pair connected in a cascode, and
   the limiting circuit is provided between the constant current circuit and an output node of the differential pair connected in the cascode.

4. The solid-state imaging apparatus according to claim 1, wherein the amplifier unit has a differential amplifier circuit and a buffer circuit connected to a following stage of the differential amplifier circuit,
   the differential amplifier circuit has a constant current circuit and a differential pair, and
   the limiting circuit is provided between the constant current circuit and an output node of the differential amplifier circuit.

5. The solid-state imaging apparatus according to claim 1, wherein the amplifier unit has a differential amplifier circuit and a buffer circuit connected to a following stage of the differential amplifier circuit,
   the differential amplifier circuit has a constant current circuit and a differential pair, and
   the limiting circuit is provided between an output node of the buffer circuit and a node of a ground potential.

6. The solid-state imaging apparatus according to claim 4, wherein the buffer circuit is a common source amplifier circuit.

7. The solid-state imaging apparatus according to claim 1, further comprising an analog to digital converter configured to convert an analog signal amplified by the amplifier unit to a digital signal.

8. The solid-state imaging apparatus according to claim 1, wherein the limiting circuit is a MOS transistor, configured to limit the level of the output signal from the amplifier unit by flowing a current into the MOS transistor.

9. The solid-state imaging apparatus according to claim 1, wherein the limiting circuit is provided in a feedback loop of the amplifier unit.

10. The solid-state imaging apparatus according to claim 1, wherein the limiting circuit is provided out of a feedback loop of the amplifier unit, and at an output node of the amplifier unit.

11. An imaging system comprising the solid-state imaging apparatus according to claim 1; and
an optical system configured to focus light onto the solid-state imaging apparatus.

12. The solid-state imaging apparatus according to claim 1, wherein the limiting circuit is a MOS transistor, a voltage supplied to a gate of the MOS transistor is switched between the first period and the second period, such that a range to which the level of the output signal from the amplifier unit is limited is changed between the first period and the second period.

13. The solid-state imaging apparatus according to claim 1, wherein the limiting circuit is a MOS transistor, a voltage supplied to a gate of the MOS transistor is switched between the first period and the second period, such that the limiting circuit limits the level of the output signal from the amplifier unit in the first period to a first range, and limits the level of the output signal from the amplifier unit in the second period to a second range, the first range being narrower than the second range.

14. The solid-state imaging apparatus according to claim 1, wherein the amplifier unit clamps the signal generated by the photoelectric conversion unit during a clamping period, and
the limiting circuit is switched from the first range to the second range after the clamping period and before the second period.

15. The solid-state imaging apparatus according to claim 1, wherein the limiting circuit includes a MOS transistor whose gate inputs a clip voltage (VCLIP_N) that is equal to a voltage (VREF+VOD+$\Delta$Vth), where VREF is the reference voltage, $\Delta$Vth is a maximum variation of offset voltage of the differential amplifier, and VOD is an overdrive voltage of the MOS transistor.

* * * * *